United States Patent [19]

Fromherz et al.

[11] Patent Number: 5,696,893
[45] Date of Patent: Dec. 9, 1997

[54] SYSTEM FOR GENERICALLY DESCRIBING AND SCHEDULING OPERATION OF MODULAR PRINTING MACHINE

[75] Inventors: Markus P. J. Fromherz, Palo Alto; Vijay A. Saraswat, Fremont, both of Calif.; Marc W. Webster, Rochester, N.Y.

[73] Assignee: Xerox Corporation, Stamford, Conn.

[21] Appl. No.: 476,510

[22] Filed: Jun. 7, 1995

[51] Int. Cl.⁶ .................................................. G06K 15/00
[52] U.S. Cl. ........................................ 395/112; 395/101
[58] Field of Search .............................. 395/112, 114, 395/101, 109, 115, 116, 117, 500, 650, 800, 700, 375, 550, 904, 674, 672, 670, 676, 551, 553, 412, 97, 508, 511; 355/202, 206, 209, 208, 323, 204, 203, 205, 318, 319, 320; 364/578, 468, DIG. 1, DIG. 2, 977.5, 468.01, 468.02, 468.03, 468.05, 468.06, 468.04, 468.08, 468.09, 468.13, 468.15, 149-151, 471.01-471.02; 358/296, 468; 399/9, 1, 401, 16-17, 27-28, 30, 77, 364, 374, 370, 372, 382, 130

[56] References Cited

U.S. PATENT DOCUMENTS

| | | | |
|---|---|---|---|
| 4,991,176 | 2/1991 | Dahbura et al. | 371/27 |
| 5,038,307 | 8/1991 | Krishnakumar et al. | 364/578 |
| 5,056,014 | 10/1991 | Burrows | 364/200 |
| 5,095,342 | 3/1992 | Farrell et al. | 355/319 |
| 5,095,369 | 3/1992 | Ortiz et al. | 358/296 |
| 5,107,299 | 4/1992 | Farrell et al. | 355/207 |
| 5,125,098 | 6/1992 | Burrows | 395/800 |
| 5,159,395 | 10/1992 | Farrell et al. | 355/319 |
| 5,161,115 | 11/1992 | Teshima et al. | 364/551.01 |
| 5,179,410 | 1/1993 | Farrell et al. | 355/207 |
| 5,179,637 | 1/1993 | Nardozzi | 395/114 |
| 5,184,185 | 2/1993 | Rasmussen et al. | 355/308 |
| 5,187,587 | 2/1993 | Farrell et al. | 358/296 |
| 5,287,194 | 2/1994 | Lobiondo | 395/114 |
| 5,301,100 | 4/1994 | Wagner | 364/148 |
| 5,325,528 | 6/1994 | Klein | 395/650 |
| 5,337,135 | 8/1994 | Malachowski et al. | 355/319 |
| 5,363,175 | 11/1994 | Matysek | 355/208 |
| 5,375,202 | 12/1994 | May et al. | 395/164 |
| 5,469,533 | 11/1995 | Dennis | 395/114 |
| 5,495,339 | 2/1996 | Stegbauer et al. | 358/296 |

OTHER PUBLICATIONS

Xerox Disclosure Journal; vol. 15, No. 5; Sep./Oct. 1990.

Primary Examiner—Edward L. Coles
Assistant Examiner—Dov Popovici
Attorney, Agent, or Firm—Fay, Sharpe, Beall, Fagan, Minnich & McKee

[57] ABSTRACT

A system is provided to allow for automated scheduling and completion of print jobs in a printing machine. A generic system for describing functionality of various modules forming a print engine is described. Such a module description is provided for each of a plurality of subassemblies which form the printing machine. A component communicates description information about itself to a scheduling unit once it is integrated into a complete printing machine. The scheduling unit, in turn, analyzes all functions available from various subassemblies comprising the machine. This analysis returns data representative of all available functions to the printing machines. Upon receipt of user input on one or more printing jobs, the scheduler then correlates the user information with the available properties of the printing machine to schedule an efficient completing of all printing tasks.

19 Claims, 5 Drawing Sheets

SYSTEM FOR GENERICALLY DESCRIBING AND SCHEDULING OPERATION OF MODULAR PRINTING MACHINE

BACKGROUND OF THE INVENTION

This is a related application to commonly owned U.S. patent application Ser. No. 08/485,848, filed Jun. 7, 1995, entitled A METHOD FOR AUTOMATICALLY DERIVING PRINT ENGINE CAPABILITIES FOR INCREMENTAL SCHEDULING FROM COMPOSITIONAL PRINT ENGINE MODELS; U.S. patent application Ser. No. 08/472,151, filed Jun. 7, 1995, entitled A GENERIC SYSTEM FOR DESCRIBING AND USING RESOURCES FOR PRINT ENGINE SCHEDULING; U.S. patent application Ser. No. 08/485,846, filed Jun. 7, 1995, entitled A SYSTEM FOR AUTOMATICALLY CONFIGURING PRINT ENGINE SOFTWARE FROM PRINT ENGINE MODULE CAPABILITIES; U.S. patent application Ser. No. 08/486,646, filed Jun. 7, 1995, entitled A GENERIC METHOD FOR SCHEDULING PRINT ENGINES USING PRINT ENGINE CAPABILITIES; and U.S. patent application Ser. No. 08/475,003, filed Jun. 7, 1995, entitled A GENERIC METHOD FOR AUTOMATICALLY GENERATING FINITE-STATE MACHINES FOR SCHEDULING FROM PRINT ENGINE CAPABILITIES; the contents of each of which are incorporated herein by reference.

This application pertains to the art of printing machines and more particularly to photo-duplication machines such as copiers.

The invention is particularly applicable to the automated scheduling of printing jobs pursuant to the capabilities associated with modular components forming a printing machine and will be described with particular reference thereto. However, it will be appreciated that the invention has broader application, such as in providing for an automated assessment of machine capabilities in view of modular components, as well as job specific utilization in an efficient manner in view of the same.

Present day machinery, such as photocopiers, is often fabricated from pre-fabricated components. Such fabrication allows for mass production of each of the subassemblies of a machine while simultaneously allowing for customization to consumer's needs. Further, a consumer is provided with a means by which he or she may alter or upgrade capabilities of an existing, base unit.

Earlier systems for distributed printing and distributed job scheduling may be found in U.S. Pat. Nos. 5,287,194 and 5,363,175 commonly owned by the assignee hereof.

One concern with modular assembly of integrated units is provided with configuring and optimizing use of a completed system. While this is of concern for the manufacturer of an initial unit, it is perhaps an even greater concern to the end user. End users are often technically unsophisticated. However, they are driven by a desire for increased capability of a machine while a desire to maintain their value of their initial investment. Consumers are also dissuaded from expenses associated with hiring a professional to upgrade or configure existing equipment.

The present invention contemplates a new and improved system for automatically ascertaining machine capability and utilizing the same which overcomes the above-referred problems, and others, and provides a system with enhanced usability and configurability both prior to and after the machine leaves the factory.

SUMMARY OF THE INVENTION

In accordance with the present invention, there is provided a system for generically and uniquely describing capabilities of various individual modular machine components.

The subject system provides for acquisition of module data which represents functional characteristics of each of one or more machine modules. Description data associated with each such module represents a structure or function of that particular module. The system functions to acquire setup data which represents a mechanical or electrical interrelation between the one or more machine modules. An input/output unit received acquired description data and setup data into a scheduler. A comparison means is disposed in the scheduler and serves to analyze description data and setup data to determine a set of machine functions practicable by a machine form from the one or more machine modules.

In accordance with another aspect of the present invention, a system is provided for automatically recognizing a presence of one or more subassemblies and communicating their various functional descriptions to a centralized processor unit for assessment and analysis.

In accordance with another aspect of the present invention, the system provides for an efficient, automated scheduling of a plurality of print jobs of various or varying characteristics.

An advantage of the present invention is the provision of a printing machine that may be easily and automatically configured to various or varying subassemblies.

Another advantage of the present invention is the provision of a printing machine that may be easily configured to maximum potential by an end-user.

Yet another advantage of the present invention is a provision of a printing machine that maximizes printing throughput by efficiently scheduling and utilizing modular subassemblies in accordance with user-specified print jobs.

Further advantages will become apparent to one of ordinary skill in the art upon a reading and understanding of the subject specification.

BRIEF DESCRIPTION OF THE DRAWINGS

The invention may take physical form in certain parts, and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
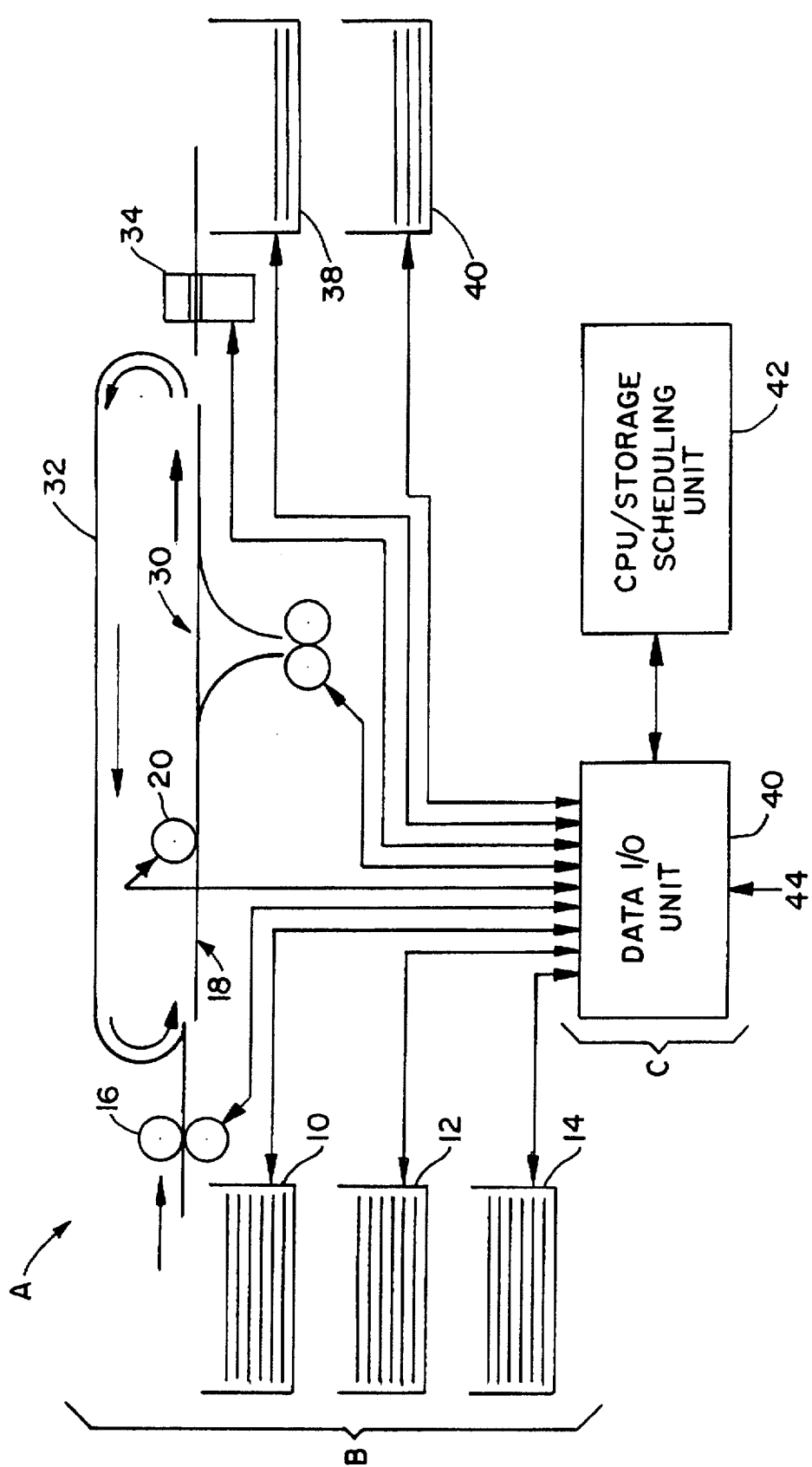
FIG. 1 provides a schematic of representative, modular printing machine incorporating the automated configuration and scheduling of the subject invention.

Turning now to the drawings wherein the purpose is for illustrating the preferred embodiment of the invention only, and not for the purpose of limiting the same, FIG. 1 illustrates an embodiment of the subject invention having a modular print engine A which includes a plurality of modules or subassemblies B and a data-processor unit for configuration and scheduling C. Representative print modules in B have been enclosed in dotted lines in FIG. 1. As used herein "print engine" includes any reprographic machine, such as printers, copiers, facsimile machines, and the like.

As will be detailed below, various capabilities provided with each of the modules B are ascertained and correlated in the data processor unit C. Such correlated and analyzed data is further analyzed in view of user input defining a desired printer operation, or series of operations. This is, in turn, used to optimize, schedule, and control operation of the printing machine to most efficiently accomplish the series of printing tasks. The subject system is described by way of example with a copier machine. It will be appreciated that generic description, resource assessment and scheduling may be practicable on any modular, material handling system.

With the particular example of FIG. 1, the modules B are illustrated as including a plurality of paper storage bins. In the illustration, these include bins 10, 12, and 14. The plurality of bins may be representative of different paper sizes or secondary or reserved storage capability. A sheet feeder mechanism is illustrated schematically at 16. As will be appreciated by one of ordinary skill in the art, a sheet feeder such as that illustrated at 16 will function to obtain sheet stock from one or more of the bins.

The feeder 16 will feed sheet stock to a conveyor 18 (note: not incorporated into dotted lines). The conveyor will, in turn, feed sheet stock to a print mechanism 20, the particular construction of which will be well within the understanding of one of ordinary skill in the art. Also illustrated in the figure is an inverter mechanism 30 that may selectively invert or flip sheet stock that progresses along the conveyor 18. A feedback-unit 32 is provided for returning sheet stock to the printer mechanism 20 for duplex printing thereof.

In the illustration, the conveyor 18 provides a path to a stapling mechanism 34 for selective stapling of printed documents. The final, illustrated component in the group of modules B illustrates a plurality of output bins represented by bins 38 and 40.

It will be appreciated that some modules may be purely mechanical, some may consist of a mixture of mechanical and computational devices, and some may consist only of computational devices. By way of example regarding the latter, a module may consist of a processor, data storage and instruction storage, and a set of functions which are able to accept image data from user input, to process the image data, and to send it to another module for printing. Depending on the speed of these functions, such a module is scheduled and controlled like all other modules B. The invention is intended for all such modules. Several example modules will be described in connection with FIG. 4, below.

Turning to the data processor unit C, included therein is a data input/output ("I/O") unit 40 which is in data communication with a central processor unit ("CPU")/storage scheduling unit 42, the details of which will be described further below. A data path is provided between the data I/O unit 40 and each of the modules B. It will be appreciated that such data processor unit may be located in one of the modules B, or may be implemented on a separated device connected to the modules.

In the preferred embodiment, each module B includes therein a description associated with various functions and capabilities thereof. The particulars of such a generic description will be detailed below. The data path between each of the illustrated modules and the data I/O unit allows for acquisition to the data processor unit C of all such description. In the preferred embodiment, any module B will communicate its associated description to the data I/O unit upon connection to the modular print engine A. This ability allows for "plug-and-play" capability of the subject system.

Data interconnections between the data I/O unit 40 of the data processor C and the various modules B also allow for controller activation thereof. Thus, the data processor unit C has ascertained from the available modules the complete set of capabilities of the modular print engine A. This information, coupled with user input 44 to the data I/O unit 40 allows for efficient scheduling of available, modular resources to accomplish a series of printing jobs by use of the available components.

Figure 2:
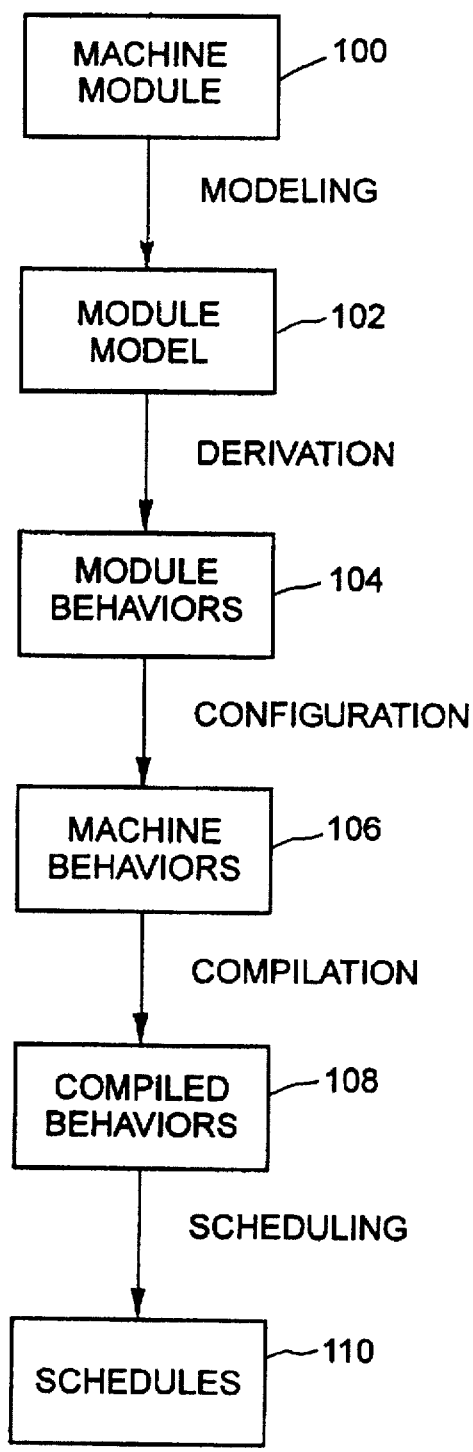
FIG. 2 provides a flow chart detailing the hierarchical ordering of operations to accomplish the configuration and scheduling of the present invention.

Turning next to FIG. 2, the basic format for generic print engine description and scheduling will be described. As alluded to earlier, past attempts for automated print engine scheduling software were based on an analysis of a complete engine configuration. The results of this analysis are required for writing of dedicated software specific to a particular configuration. Conversely, the subject system provides for separation of scheduling software into two parts. In a first part, a scheduler architecture is provided with generic algorithms. In a second part, machine-specific information is also provided in a format detailed below.

Given a document to be printed on a given print engine, a scheduler is provided which serves to identify, schedule, and initiate machine operations for producing a document. In the illustration of FIG. 1, such operations may include feeding of sheets, moving of sheets, preparation of images, transferring of images to sheets, etc. It will be appreciated that a document to be printed typically arrives incrementally (e.g., sheet-by-sheet). Scheduling and schedule execution (printing) usually happen concurrently. As a consequence, machine-specific information used by a scheduler is advantageously structured such that the scheduler is able to identify which operations will produce the required sheet. Further, the system must be aware of constraints which must be observed when scheduling operations. Additionally, the system is provided with a means by which it may send appropriate commands to the modules to allow them to accomplish their available functions.

In the diagram of FIG. 2, the particular system for preparing the machine-specific information is depicted. The system commences by using declarative descriptions (models) of printing engine modules in block 100. Such a model advantageously contains description of a module's structure and potential behavior of its components. As noted in the example of FIG. 1, possible components include feed trays, transport belts, transfer components, inverters, gates, etc. Potential behaviors may be, by way of example, either bypassing an inverter or using it to invert a sheet. The step of modeling is typically performed by an engineer using a modeling language, the details of a preferred embodiment of which will be provided below.

At block 102, a module has already been modeled by its components. Next, an automatic derivation of potential behaviors of an entire module is then fabricated from information obtained from the component models. This derivation may be performed, by way of example, by simulation or partial evaluation, and by envisionment. Simulation is commonly understood as the execution of models to mirror the execution of the real system. Partial evaluation is commonly understood as the partial execution of programs, leaving certain parts of the programs unexecuted and to be evaluated at a later time. Envisionment is commonly understood as the exploration of all potential behaviors of a system by, for example, repeatedly and in various ways exercising simulation or partial evaluation of its models. The resulting module behavior is comprised of an output produced by a particular behavior, inputs from which the output is produced, individual operations required to produce it (its "itinerary"), as well as various constraints on resources and timings to be observed when performing the operations. Some or all of this information may advantageously be precompiled. By way of example, this may be compiled to finite-state machines.

When print engine modules B (FIG. 1) are plugged together to form a new configuration, different module behaviors are collected and automatically composed via the data processor unit C to generate potential behaviors of a complete print engine A.

The afore-noted composition is also suitably enabled to occur dynamically, i.e., each time a behavior is to be selected by the scheduler, it composes module behaviors on-the-fly. Thus, a composition may be done only once (after modules are first plugged together), or each time they are needed. The latter option has an advantage of accounting for dynamic module changes. Thus, the system may complete the FIG. 2 sequence each time a machine behavior is selected. It may be prohibitive to do so due to the time-consuming computations. However, this may be a more efficient approach in specific circumstances.

In block 104, the afore-noted, overall behavior is advantageously modeled in a format similar to that associated with the individual module behavior noted above. Per distinct overall behavior, the system provides an output description (for behavior identification), resource and timing constraints (for sequencing), and data comprising an itinerary (for subsequent control of machine operations).

Next, a portion of machine behavior information is advantageously compiled for efficient use in a matching scheduler algorithm at which point the system progresses to block 106. By way of example, a compilation of potential interactions of timing and resource constraints may be made to a finite-state machine. An example of finite-state machine scheduling may be found in the co-owned U.S. patent application Ser. No. 08/426,207, filed Apr. 21, 1995, entitled PRINT SEQUENCE SCHEDULING SYSTEM FOR DUPLEX PRINTING APPARATUS, which issued as U.S. Pat. No. 5,504,568, on Apr. 2, 1996, the contents of which are incorporated herein by reference. At block 108, a full set of compiled behaviors has been obtained.

Lastly, at block 110, an output description of machine behaviors is used by a generic scheduler to identify behaviors that will produce an output document given the original constraints (either in original or compiled form). These are used to find a correct timing for each particular behaviors' operation and itineraries which are used to initiate necessary operations of the modules B.

While the afore-going description is provided by way of preferred embodiment, it will be appreciated that not all of the steps are required to provide a usable system. For example, only a portion of all components need be modeled and compilation of all constraints need not be accomplished.

With the system described above, modular ("plug-and-play") scheduling of print engine modules is facilitated. The system also allows for reuse of scheduling software for a wide range of configurations. It also provides for automating all steps but that of obtaining the initial description of the discrete modules forming the machine and for development of the generic scheduling algorithms.

Figure 3:
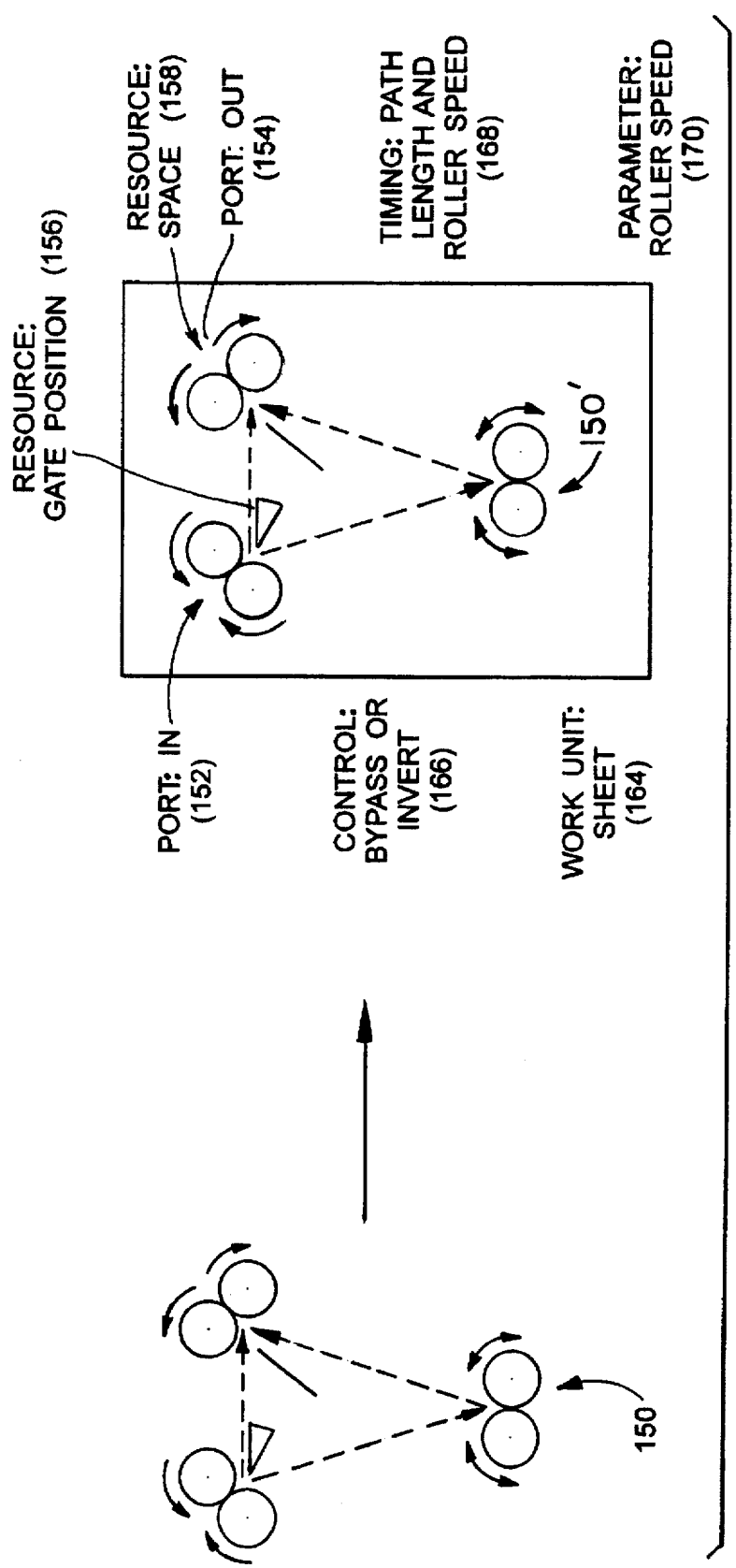
FIG. 3 provides a diagram of a representative, generic description of a print machine component as used in connection with the subject, automated scheduling and configuration of the subject invention.

Turning now to FIG. 3, a particular system for modeling component behavior will be described. The particular system of the preferred embodiment is for a description of print engine component behavior for print engine analysis, simulation, and scheduling. As noted above, the basic, generic description method is equally applicable to various other modular systems.

In the subject description method, structure and behavior of components is described in terms of capabilities (potential operations) for which constraints on work units, timings, and resources are stated. This modeling system enables structural and behavioral composition of components for analysis and simulation of component interactions in print engines. The system is particularly applicable for scheduling operation of modular print engines.

With the subject scheme, one may describe print engine components such that print engines fabricated therefrom may be described by composing component descriptions. Further, various applications may be performed automatically on resulting print engine description. This enables one to automatically use such information for analysis, simulation, scheduling, and related print engine applications. In the illustrated example of FIG. 3, descriptions associated with an inverter 150, analogous to the inverter 30 of FIG. 1, are provided with model 150'. Components of a modeled structure and behavior are determined by both physics of the component itself, as well as an application context in which a model is used.

In the system, a structure model of a component is defined as consisting of its physical interface, software interface and internal resources. For example, a physical interface is an input port 152 along which work units (sheets) enter and a port 154 from which said work units exit. Associated software interface functions primarily for control commands and parameters. Internal resources are defined as objects needed to perform a particular behavior, and where multiple uses of the object by repeated execution of the behavior is restricted. By way of example in FIG. 3, a resource is defined as the position of an associated gate 156. Another example of a resource is a space 158 between opposing output rollers 160 of the inverter 150, particularly illustrated at 150'. Here, as with most points of the paper path, there is sufficient space for only one sheet at any single point in time. Thus, the space 158 is defined as a resource. Which objects to model as resources is at the discretion of the modeler and will be known by one skilled in the art. Typically, at least one place within a component (for example, at entry or exit port of a component) where moving objects use up space or otherwise require exclusive use of a component part is defined as a resource.

A behavior model of a component is utilized to describe capabilities of the particular component in terms of how the component may work on work units moving through the component. Further, the behavior dictates what constraints must be observed when performing the associated behavior.

A component capability is defined as consisting of a description of work units and a transformation of work units, timed events like the input and output of a work unit, of resource allocations for this transformation, and of constraints on the timing of such events and resource allocations. Work units are advantageously described in terms of their attributes. Restrictions and transformations of work units are advantageously described in terms of constraints on their attributes.

In FIG. 3, some additional model descriptions are provided. These include a description associated with a particular work unit, such as a sheet illustrated at 164. A control situation, such as to whether or not to by-pass the inverter 150 or utilize it for inversion is illustrated at 166. A timing parameter, such as a specification of path length and roller speed is provided at 168. By way of example, associated timing constraints are suitably obtained using a formula based on path length and roller speed, e.g., time out may be defined as time in plus path length, divided by roller speed. Certain values are also suitably parameters of the model, e.g., the path length of a given inverter is fixed, while roller speed may vary and may therefore be set by the environment with respect to a model that is used. A roller speed parameter is illustrated at 170.

By way of particular example, the following listing provides a suitable model of an inverter as depicted in connection with FIG. 3:

---

Component inverter(length: Millimeters, speed: MillimetersPerSecond)
Has
    EntryPorts in: Sheet;
    ExitPorts out: Sheet;
    Resources inR, outR: Signal; gateR: State({Bypassing,Inverting}, Bypassing);
    Variables s s_in s_out Sheet; t_in, t_out, t_gate: Interval;
    Capability bypass(t_n) Is
        in.input(s, t_n);
        out.output(s, t_out);
        inR.allocate(1, t_in);
        outR.allocate(1, t_out);
        gateR.allocate(Bypassing, t_gate);
        t_in.START + length/speed = t out.START;
        t_in.DURATION = t_out.DURATION;
        t_gate.START = t_in.START;
        t_gate.END = t_out.END;
    End bypass;
    Capability invert(t_in) Is
        in.input(s_in; t_out);
        out.output(s_out, t_out);
        inR.allocate(1, t_in);
        outR.allocate(1, t_out);
        gateR.allocate(Inverting, t_gate);
        s_out = s_in with
            {SHEET.ORIENTATION=
            Rotate(Y, 180, s_in.SHEET,
            ORIENTATION)};
        t_in.START + length/speed +
        SheetLength(s_in.SHEET.SIZE)/speed=t_out.START;
        t_in.DURATION = t_out.DURATION;
        t_gate.START = t_in.START;
        tgate.END = t_out.END
    End invert
End inverter.

---

This model declares two parameters (length and speed), one entry port (in), one exit port (out), three resources (inR, outR and gateR, of types Signal respectively State), and six variables (of types Sheet and interval). Then the model defines two capabilities (bypass and invert). For capability bypass, it is defined that a sheet s enters at time t_in and exits at time t_out, that allocations in all three resources are made at the respective intervals t_in, t_out and t_gate, and that various timing constraints reflecting the traveling time from entry to exit hold between the intervals. Capability invert is defined similarly, except that the sheet changes its orientation by 180° (rotated around the y axis), and that the traveling time is longer (proportional to the sheet's size). Thus, it will be appreciated that a complete and functional description of any component may be similarly provided.

With the disclosed modeling system, a component structure is described without relying on any reference to descriptions of or interactions with other components. Such component behavior is described on one work unit without other units. Further, the disclosed modeling system enables automatic behavioral composition of component capabilities for generic and incremental analysis, simulation, and scheduling of print engines. This description format allows automatic structural composition of component models to models describing connected components (for example, print engine modules).

Conversely, earlier approaches had their capabilities and constraints expressed in terms of both specific interactions between components and interactions between sequences of sheets or images. This renders them more difficult to define, renders them non-reusable, and further renders them non-compositional. The system modeling format allows for the automatic configuration, optimization, and scheduling described above.

Figure 4A:
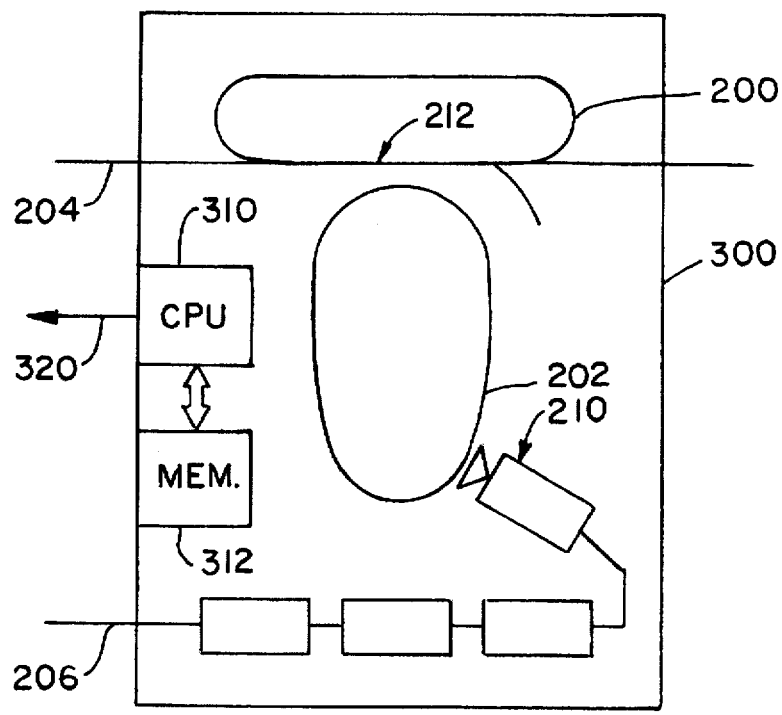
FIG. 4A-4B evidence various modules suitable for use in the subject invention.
Figure 4B:
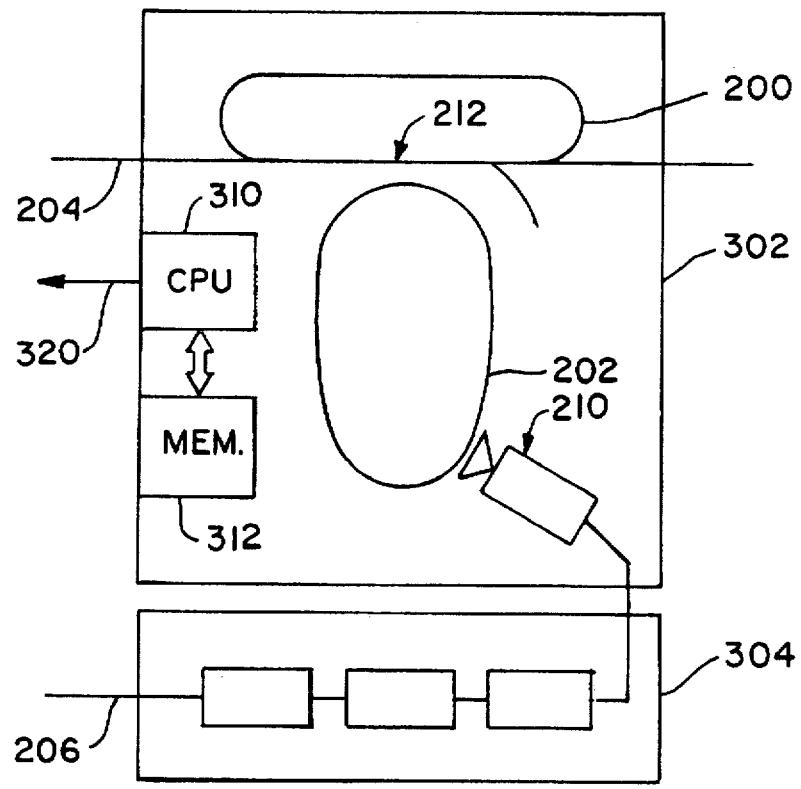

Turning now to FIGS. 4A–4B, these figures evidence various modules which are suitably implemented in either software or hardware in connection with the subject invention. In each of the modules of FIG. 4A–4B, provided in common is an example which includes a duplex or feedback mechanism 200, an photoreceptor belt 202, a work unit or paper path 204, and an image path 206. It is noted that an image path typically consists of image processing components which are implemented in software or a combination of electronic hardware and software. In each example, a video image from the image path 206 is suitably layed down onto the photoreceptor belt 202 at a junction 210 and then transferred to a sheet from paper path 204 at a junction 212.

Turning particularly to the example of FIG. 4A, provided is a module 300 which incorporates image processing directly into the same module provided with the work unit handling capability.

The example of FIG. 4B provides separate modules 302 and 304 for an engine module and an image processing module, respectively. It will be appreciated that the examples of FIGS. 4A and 4B are by way of example only. Various other combinations and subcombinations of various work unit handling capability, as well as image handling capabilities, may be implemented in connection with the subject invention.

In each of the modules in the examples of FIGS. 4A and 4B, also evidenced is a CPU 310 and an associated memory disposed in an address space thereof. In the preferred embodiment, the memory 312 includes a non-volatile memory storage portion which is adapted to stored description data representative of the module. The system also provides a port 320 adapted for communicating such data to an associated scheduler. As noted above, such data may include data representative of at least one of identification, scheduling, and initiation of available operations in the associated scheduler in data communication with the respective module. In the image processing module 304 of FIG. 4B, it will be appreciated that, in the preferred embodiment, similar CPU capability, memory capability, and description data output capability is provided although such has been eliminated from the figure for ease in illustration.

Figure 5:
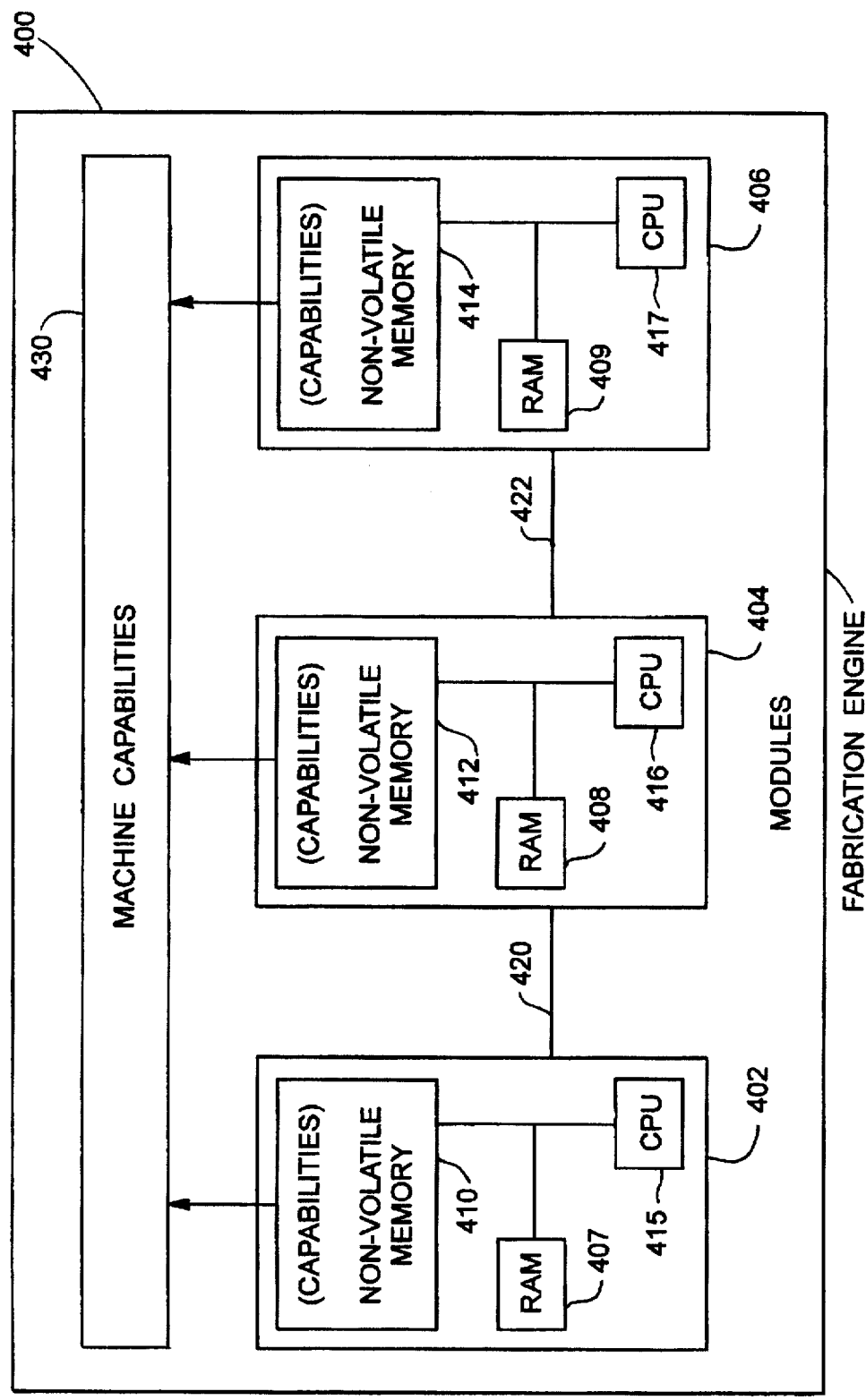
FIG. 5 is a block diagram of modules interconnected in accordance with the present invention to form a generalized fabrication unit.

Turning now to FIG. 5, a generalized fabrication engine 400 is provided. The fabrication engine 400 includes modules, three of which are evidenced at 402, 404, and 406, respectively. The modules include memory suitably comprised of RAM regions 407, 408, and 409, respectively, in addition to non-volatile memory regions 410, 412, and 414, respectively. The non-volatile memory is suitably comprised of read only memory ("ROM"), erasable programmable read only memory ("EPROM"), electrically erasable programmable read only memory ("EEPROM"), or the like.

The non-volatile memory regions 410, 412, and 414 are advantageous for storing capability information, the particulars of which were described in detail above. The respective RAM regions allow for scratch pad memory, as well as storage of software to drive an associated CPU. CPUs 415, 416, and 417 are provided in modules 402, 404, and 406, respectively.

Also evidenced by FIG. 5 is a data port 420 which interconnects modules 402 and 404 for communication of work units therebetween. Similarly, a port 422 is provided between modules 404 and 406 for communication of work units therebetween. Finally, each of the modules 402, 404, and 406 are noted to be in data communication with an associated scheduler as evidenced by machine capabilities unit 430.

This invention has been described with reference to the preferred embodiment. Obviously, modifications and alterations will occur to others upon a reading and understanding of the specification. It is intended that all such modifications and alterations be included insofar as they come within the scope of the appended claims or the equivalents thereof.

Having thus described the invention, it is now claimed:

1. A system for generating an automated machine operation schedule comprising:

module data acquisition means adapted for acquiring description data representative of functional characteristics of a plurality of machine modules, the description data associated with each module including data representative of a machine module structure, function or capabilities, wherein each machine module is comprised of at least one of an electro-mechanical and software component adapted for performing operations on at least one work unit, the acquired description data of each of the plurality of machine modules being independent of the structure, function, or capabilities of any other machine module;

means for acquiring setup data representative of at least one of mechanical and electrical interrelationships between the plurality of machine modules;

an input/output unit for receiving acquired description data and setup data into a generic scheduler, the generic scheduler configured to operate independent of the description data representative of the structure, function, or capabilities of the plurality of machine modules, the generic scheduler including a data storage, a processor, and an instruction storage; and comparison means, disposed in the generic scheduler, for analyzing the description data and the setup data to determine a set of machine functions practicable by a machine comprised of the machine modules.

2. The system for generating an automated machine operation schedule of claim 1 further comprising at least one machine module including, a memory storing description data; and a data port adapted for communicating description data associated therewith to the module data acquisition means.

3. The system for generating an automated machine operation schedule of claim 2 further comprising:

means for receiving input representative of a user-specified machine output;

means for communicating the operator input to the comparison means; and the generic scheduler further including control means for generating a control signal adapted for controlling each machine module in accordance with determined machine functions to accomplish the user-specified machine output.

4. The system for generating an automated machine operation schedule of claim 3 further comprising means for performing analysis of the description data by implementation of at least one of partial evaluation, simulation, abduction and envisionment on the description data.

5. The system for generating an automated machine operation schedule of claim 4 further comprising:

means for determining a presence of each machine module in data communication with the module data acquisition means; and means for automatically communicating the description data from each machine module identified by the determining means, whereby setup data is generated.

6. The system for generating an automated machine operation schedule of claim 5 wherein the comparison means further includes means for dynamically re-analyzing the description data each time a machine module is placed in or removed from data communication with the module data acquisition means.

7. The system for generating an automated machine operation schedule of claim 1 wherein the generic scheduler is a predictive scheduler.

8. A method of generating an automated operation schedule comprising the steps of:

acquiring description data representative of functional characteristics of a plurality of machine modules, the description data associated with each machine module including data representative of a module structure, function, or capabilities thereof, the acquired description data of a machine module being independent of the structure, function, or capabilities of any other machine module;

acquiring setup data representative of at least one of mechanical and electrical interrelationships between the plurality of machine modules;

receiving the acquired description data and setup data into a generic scheduler, the generic scheduler including a data storage, a processor, and an instruction storage, the generic scheduler configured to operate independent of the description data representative of the structure, function, or capabilities of the plurality of modules; and analyzing, via the generic scheduler, the description data and the setup data to determine a set of functions practicable by a machine comprised of the machine modules.

9. The method of generating an automated operation schedule of claim 8 further comprising the step of communicating the description data stored within each of at least one machine module to the generic scheduler.

10. The method of generating an automated operation schedule of claim 9 further comprising the steps of:

receiving operator input representative of a user-specified machine output into the generic scheduler; and generating control signalling adapted for controlling each machine module in accordance with determined machine functions to accomplish the user-specified machine output.

11. The method of generating an automated operation schedule of claim 10 wherein the step of analyzing includes the step of performing analysis of the description data by implementation of at least one of partial evaluation, simulation, abduction and envisionment on the description data.

12. The method of generating an automated operation schedule of claim 11 further comprising the steps of:
   determining each machine module capable of supplying the description data; and
   automatically communicating the description data from each determined machine module to the generic scheduler.

13. The method of generating an automated operation schedule of claim 12 wherein the step of analyzing includes dynamically re-analyzing the description data each time a machine module is placed in or removed from data communication with the generic scheduler.

14. A method of generating an automated operation schedule comprising the steps
   acquiring description data representative of functional characteristics of a plurality of printer modules, the description data associated with each printer module including data representative of a printer module structure, function, or capabilities thereof, the acquired description data of a printer module being independent of the structure, function, or capabilities of any other printer module;
   acquiring setup data representative of at least one of mechanical and electrical interrelationships between the plurality of printer modules;
   receiving the acquired description data and setup data into a generic scheduler, the generic scheduler including a data storage, a processor, and an instruction storage, the generic scheduler configured to operator independent of the description data representative of the structure, function or capabilities of the plurality of printer modules; and
   analyzing, via the generic scheduler, the description data and the setup data to determine a set of printer functions practicable by a printer comprised of the printer modules.

15. The method of generating an automated operation schedule of claim 14 further comprising the step of communicating the description data stored within each of at least one printer module to the generic scheduler.

16. The method of generating an automated schedule of claim 15 further comprising the steps
   receiving operator input representative of a user-specified printing output into the generic scheduler; and
   generating control signalling adapted for controlling each printer module in accordance with determined printer functions to accomplish the user-specified printing output.

17. The method of generating an automated operation schedule of claim 16 wherein the step of analyzing includes the step of performing analysis of the description data by implementation of at least one of partial evaluation, simulation, abduction and envisionment of the description data.

18. The method of generating an automated operation schedule of claim 17 further comprising the steps of:
   determining each printer module capable of supplying the description data; and
   automatically communicating the description data from each determined printer module to the generic scheduler.

19. The method of generating an automated operation schedule of claim 18 wherein the step of analyzing includes dynamically re-analyzing the description data each time a printer module is placed in or removed from data communication with the generic scheduler.

* * * * *